Nov. 3, 1942.   E. C. WENTE   2,300,638
ALTERNATING CURRENT GENERATOR
Filed May 21, 1941

INVENTOR
E. C. WENTE
BY John A. Hall
ATTORNEY

Patented Nov. 3, 1942

2,300,638

UNITED STATES PATENT OFFICE 2,300,638

ALTERNATING CURRENT GENERATOR

Edward C. Wente, New York, N. Y., assignor to Bell Telephone Laboratories, Incorporated, New York, N. Y., a corporation of New York Application May 21, 1941, Serial No. 394,467

2 Claims. (Cl. 179—90)

This invention relates to signaling means and particularly to alternating current generators of the type used in telephones for generating alternating current dialing signals representing telephone station designations.

The object of the invention is to provide an efficient reed generator of small dimensions. In this general class of minute alternating current generators of simple construction it is essential that the dimensions, the quality of materials used and the method of operation be most carefully selected and controlled and that advantage be taken of every means to promote efficiency. This object is attained in one respect by the present invention by which hysteresis and eddy-current losses are reduced by including in the magnetic circuit a minimum of poor magnetic material having a high degree of retentivity. In this type of generator the reed must perforce be selected for its mechanical properties and the best magnetic material for this purpose has poor magnetic properties. Hence a generator having a minor fraction of the reed length included in the magnetic circuit has been provided.

The generator belongs in the class of reed generators in which a reed designed to have a particular natural period of vibration corresponding to the frequency of the alternating current needed for signal purposes is included in a magnetic circuit interlinked with a pick-up coil whereby when the reed is set into vibration by being plucked will through such vibration alter the conditions in such magnetic circuit and cause an alternating current to be induced in said pick-up coil.

In such generators it is used to employ a plurality of such reeds, each of a different dimension whereby a plurality of alternating currents of different frequencies may be generated and which may be transmitted either singly or in combination and in permutation codes representing different telephone designations. Energy is supplied by a permanent magnet in the said magnetic circuit and when the polarizing flux supplied by this permanent magnet is modulated by the vibration of the reed the pick-up coil interlinked with the magnetic circuit has induced in it a given frequency alternating current.

Generators of this kind are of the balanced type. That is, the reed at rest carries no flux. There is thus a simple magnetic circuit for the steady flux provided by the permanent magnet including a short air-gap. When the reed is in vibration, however, there is a multiple path for the changing flux, each branch including the reed and a part of the permanent magnet. The generator of the present invention, therefore, is in the form of a compound structure providing a simple and single permanent magnetic circuit and a compound magnetic circuit for changing flux in effect in shunt of said permanent magnetic circuit. Efficiency is improved by any means which will lower the losses in this compound magnetic circuit, and hence the structure has been so arranged and proportioned that a minimum length of reed has been included therein. Efficiency may be further promoted by constructing the remainder of the magnetic circuit of laminations of permanent magnetic material interspersed with laminations of soft iron whereby a path of low permeability for the changing flux is provided.

A feature of the invention is an alternating current generator comprising interlinked magnetic and electrical circuits and a mechanically movable magnetic element having only a minor fraction of its length within the magnetic circuit thereof.

Another feature of the invention is an alternating current generator comprising interlinked magnetic and electrical circuits and mechanically movable magnetic elements protruding through an air-gap in said magnetic circuit, characterized in this that the said air-gap is of lesser dimensions than the maximum extent of movement of said movable elements.

Another feature is an alternating current reed generator in which a uniformly long portion of each reed is included in the magnetic circuit thereof.

Still another feature is an alternating current generator operated through the vibration of reeds all having the same length and breadth but each of a different thickness whereby said reeds each have a uniformly long portion thereof in the magnetic circuit and each is tuned to a different frequency.

Other features will appear in the following description.

The drawing consists of a single sheet having three figures, as follows.

Figure 1:
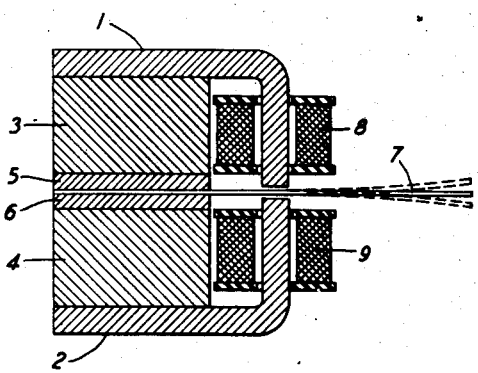
Fig. 1 is a cross-sectional side view of an alternating current generator embodying the features of the present invention.

Patent No. 2,147,710, granted on February 21, 1939, to R. F. Mallina, shows an alternating current generator as used in a telephone handset cradle for sending alternating currents of different frequencies for signaling purposes and shows in some detail a means for plucking the reeds of such a generator. The generator of the present invention is intended for a similar use and to be operated in a similar manner. The present generator, however, constitutes an improvement over such prior art generators in that the amount of reed material, which is necessarily of poor magnetic qualities, which is included in the magnetic circuit is reduced to a minimum.

The generator consists essentially of two permanent magnetic parts 1 and 2 and other high quality magnetic material spacers 3 and 4 and reed anchorage plates 5 and 6. A practically closed magnetic circuit is thus formed having only a minimum air-gap through which the reed 7 extends. The dimensions of this gap are such that the reed in full vibration will not make physical contact with either magnet 1 or magnet 2. The length of the reed from its anchorage plates 5 and 6 to the air-gap between the poles of magnets 1 and 2 is a minor fraction of the length of the reed and is determined partly by the space required for the pick-up coils 8 and 9.

Figure 2:
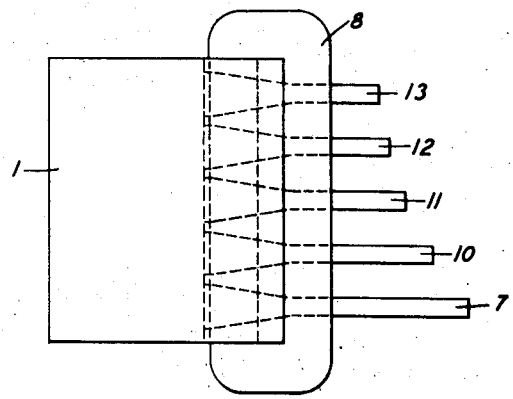
Fig. 2 is a plan view of one type of generator in which the reeds are of different lengths while the magnets are formed in the conventional manner.

In Fig. 2 one type of generator is shown. Here five reeds, 7, 10, 11, 12 and 13, are shown and are indicated as being of different lengths so that a modified plucking arrangement will have to be provided.

Figure 3:
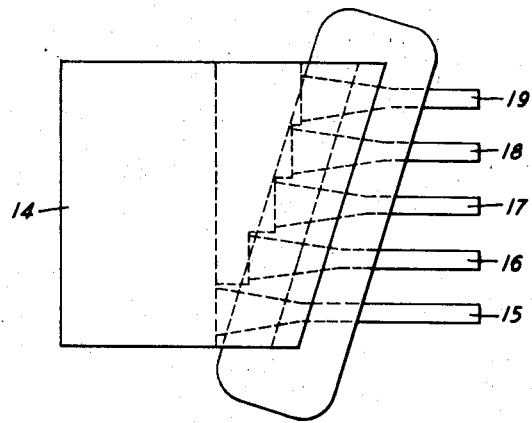
Fig. 3 is a similar view in which the magnets have been formed in an unconventional manner in order to allow the reeds which must be of different lengths to terminate along one line so that the conventional plucking device may be used.

In Fig. 3 another type of magnetic structure is shown. Here the magnet 14, corresponding to the magnet 1, has its pole-piece turned down on an angle so that the ends of the reeds 15 to 19, inclusive, will come in a straight line to be operated by the conventional plucking apparatus. In both cases the major fraction of the length of the reeds is beyond the point where they can influence the magnetic circuit.

It is intended that this specification will cover other modifications of this device which come within the spirit of this invention and the scope of the following claims.

What is claimed is:

1. An alternating current signal generator comprising interlinked magnetic and electrical circuits and movable magnetic members protruding through an air gap in said magnetic circuit, said members consisting of a plurality of reeds each having a different natural period of vibration and each constructed of material having good mechanical properties for the purpose employed and poor magnetic properties for the purpose employed, said reeds being of unequal length, a staggered anchorage for said reeds whereby they are rendered of apparent equal length, portions of the magnetic material of said magnetic circuit being formed at an angle to correspond with the general direction of said staggered anchorage, whereby equal lengths of said reeds are included within the said magnetic circuit, said lengths in each case being a minor fraction of the length of said reeds, and a common pick-up coil constructed of a winding about each said angularly formed portions of said magnetic circuit.

2. An alternating current signal generator comprising interlinked magnetic and electrical circuits and movable magnetic members protruding through an air gap in said magnetic circuit, said members consisting of a plurality of reeds each having a different natural period of vibration and each constructed of material having good mechanical properties for the purpose employed and poor magnetic properties for the purpose employed, said reeds being of unequal length and each having the same length of reed included in the said magnetic circuit, said length being in each case a minor fraction of the length of the reed, said magnetic circuit being constructed of permanent magnets common to said reeds having bent over portions approaching each other and defining said air gap and a common pick-up coil constructed of a winding about each said bent over portion of said permanent magnets.

EDWARD C. WENTE.